United States Patent Office 3,390,045
Patented June 25, 1968

3,390,045
METHOD OF MAKING PAPER FROM MICA FLAKES WHICH HAVE BEEN SUBJECTED TO HOT AQUA REGIA
John L. Miller, Jr., and Kenneth H. Ivey, Norris, Tenn., assignors to the United States of America as represented by the Secretary of the Interior
No Drawing. Filed May 27, 1965, Ser. No. 459,477
13 Claims. (Cl. 162—3)

The invention herein described and claimed may be manufactured and used by or for the Government of the United States of America for governmental purposes without the payment of royalties thereon or therefor.

This invention relates to preparation of mica paper that is stable at high temperature, highly flexible and characterized by high dielectric and tensile strengths.

Prior art mica papers have employed a variety of organic binders; however, the use of such binders limits the application of the paper to low temperature ranges, e.g., 300° C. or less. As a result, the high temperature stability of synthetic micas could not be utilized and even natural micas were limited to temperatures far below the limits inherent in the mica itself.

It has now been found that a mica paper that does not include an organic binder and is therefore stable at high temperatures may be prepared by the process described below. The product, because of its excellent electrical properties and inertness at high temperatures, is particularly valuable for use in a variety of electrical and electronic applications, e.g., tube spacers, printed circuit boards, insulators, etc.

According to the process of the invention, the mica is first crushed and split to flakes of suitable size and thickness. The flakes are then treated with hot aqua regia (about one part by volume of concentrated nitric acid to three parts of concentrated hydrochloric acid). Without wishing to be bound by any theory, we believe the aqua regia treatment removes contaminants or undesirable ions that would tend to hold the flakes apart when they contact each other. Acids other than aqua regia have been found ineffective for this purpose. Boiling aqua regia has been found most effective but temperatures of from about 75° C. to 95° C. may be used. Suitable treatment time is from about 15 to 20 minutes with optimum time depending on temperature and amount of acid. Suitable amounts of aqua regia may range from about 10 ml. to 20 ml. per gram of mica flakes, about 15 ml. per gram of mica flakes generally giving best results.

After the acid treatment the mica flakes are washed with distilled water until the acid is substantially completely removed. The mica flakes are then suspended in distilled water by vigorous stirring or other conventional means of agitation and poured onto a stainless steel screen, or other convenient draining or filtering means, to remove the water. The screen and mica are then placed in an oven at elevated temperature, such as about 110° C., to dry, or they may be allowed to dry in air at room temperature. The steel screen and resulting mica sheet may be of any suitable size, depending on the size and thickness desired for the mica paper product. Size of the sheet may range from about 288 to 422 square inches with a thickness of about 0.0005 to 0.050 inches or more. Preparation of mica sheets by this procedure, i.e., suspension in water followed by draining and drying, are conventional as disclosed in U.S. Patent No. 2,948,329 (column 4, lines 60–70).

When dry the mica is removed and cut into appropriate lengths or roled. Sheets of mica fabricated in this manner have a tensile strength of about 3000 p.s.i. or better and a dielectric strength of about 600 volts per mil or better.

It has also been found, according to the present invention, that mica paper of suitable properties is obtained only if the mica flakes have a thickness to area ratio of less than 1 to 1000. Preferably the thickness to area ratio is from about 1:1000 to 1:100,000. Flakes meeting these requirements are readily prepared by crushing and screening mica to about one square inch in area and approximately one sixteenth of an inch thick, boiling it in water for 4 to 6 hours and floating out the thin flakes that have broken away.

Another method for obtaining flakes of suitable dimensions, and giving a better yield, consists of soaking the crushed and screened one inch flakes in water. This allows the water to penetrate the partially cleaved flakes. They are then bent by hand or mechanical means and boiled for about 4 hours. The thin flakes that have broken away are removed by elutriation.

Another method of obtaining thin flakes of the proper thickness to area ratio is by placing mica flakes of approximately 1 inch in area by 1/16 inch in thickness in water and allowing it to soak from 48 to 72 hours. This water-soaked mica is then dropped through an arc furnace which is open at both ends to allow passage of the mica. The intense heat of the arc and the air turbulence created by the arc in the furnace tears the mica into very thin flakes.

Still another method of obtaining flakes of the proper thickness to area ratio is by soaking the mica of the aforementioned dimensions in a strong solution of sodium carbonate, bending the flakes by hand or by mechanical means to work the sodium carbonate between the flakes as much as possible. Sodium carbonate treated flakes are then placed in an acid resistant container with hydrochloric acid. The reaction of the hydrochloric acid with the sodium carbonate causes a violent effervescent reaction which tears the mica into very thin flakes.

The mica used as starting material may be either natural mica or synthetic mica such as fluorphlogopite mica. These materials, which are well known in the art, are of a platy nature and are easily split along cleavage planes according to the procedures described above.

The process of the invention will be more specifically illustrated by the following example.

Example 400 grams of mica flakes of approximately 1 square inch area and 1/16 inch thickness were prepared by the first procedure described above. They were then treated in 4000 ml. of boiling aqua regia for 20 minutes with intermittent stirring, washed with distilled water until all the acid was removed and then suspended in 4000 ml. of distilled water by vigorous stirring. The water was then removed by placing the suspension on a 10 inch by 10 inch stainless steel screen of 325 mesh size and allowing the water to drain off. The screen and mica were then placed in an oven at 110° C. for 30 minutes to dry and form a sheet of mica having a thickness of 0.005 inch. This resulting sheet of mica had a tensile strength of 3000 p.s.i. and a dielectric strength of 600 volts per mil.

What is claimed is:
1. A process for preparing mica paper comprising forming mica flakes having a thickness to area ratio of less than 1 to 1000, subjecting said flakes to hot concentrated aqua regia in amount from about 10 ml. to 20 ml. per gram of the mica, removing the aqua regia from the flakes, forming a water suspension of the flakes, screening the suspension and drying to form mica paper.
2. The process of claim 1 in which the thickness to area ratio is in the range of about 1:1000 to 1:100,000.
3. The process of claim 1 in which the mica is fluorphlogopite synthetic mica.
4. The process of claim 1 in which the temperature of the aqua regia is from about 75° C. to 95° C.
5. The process of claim 4 in which boiling aqua regia is employed.

6. The process of claim 1 in which the aqua regia treatment is for a period of about 15 minutes to 20 minutes.

7. The process of claim 1 in which the aqua regia is removed from the treated flakes by washing with distilled water.

8. The process of claim 7 in which the treated, washed, suspended and screened flakes are dried at a temperature of about 100° C. to 110° C.

9. The process of claim 7 in which the treated, washed and suspended flakes are air dried at room temperature.

10. The process of claim 1 in which the mica flakes are formed by boiling in water for about 4 to 6 hours.

11. The process of claim 1 in which the mica flakes are formed by soaking in water, followed by bending by mechanical means and boiling for a period of about 4 to 6 hours.

12. The process of claim 1 in which the mica flakes are formed by soaking in water for about 48 to 72 hours and then dropping the water-soaked mica through an arc furnace.

13. The process of claim 1 in which the mica flakes are formed by soaking in a solution of sodium carbonate, bending by mechanical means in the carbonate solution, and subsequently placing the carbonate-treated mica in hydrochloric acid.

References Cited

UNITED STATES PATENTS

| 2,614,055 | 10/1952 | Senarclens | 162—3 X |
| 2,898,303 | 8/1959 | Houston | 252—378 |
| 3,001,571 | 9/1961 | Hatch | 264—110 X |

DONALL H. SYLVESTER, *Primary Examiner.*

H. R. CAINE, *Assistant Examiner.*